United States Patent [19]

Corwin

[11] 4,410,986
[45] Oct. 18, 1983

[54] ERROR AND STATUS DETECTION CIRCUIT FOR A DIGITAL REGENERATOR USING QUANTIZED FEEDBACK

[75] Inventor: Walter L. Corwin, Long Valley, N.J.

[73] Assignee: Bell Telephone Laboratories, Incorporated, Murray Hill, N.J.

[21] Appl. No.: 254,915

[22] Filed: Apr. 16, 1981

[51] Int. Cl.³ .............................................. H04B 3/46
[52] U.S. Cl. ............................... 371/22; 179/175.31 R
[58] Field of Search ................. 371/22; 179/175.31 R; 375/100

[56] References Cited

U.S. PATENT DOCUMENTS

| | | | |
|---|---|---|---|
| 3,842,220 | 10/1974 | Arras | 179/175.31 R |
| 3,870,838 | 3/1975 | Corwin et al. | 179/175.31 R |
| 4,161,634 | 7/1979 | Bellisio | 179/175.31 R |
| 4,354,054 | 10/1982 | Bellisio | 179/175.31 R |

Primary Examiner—Charles E. Atkinson
Attorney, Agent, or Firm—Richard B. Havill

[57] ABSTRACT

A digital regenerator line includes in each station a status and error detection arrangement having an error detection circuit (64) responsive to a filtered composite output signal (101) from a low-pass filtered output from a digital regenerator (30) using quantized feedback. The filtered composite signal includes a stressing signal and a quantized feedback error burst. A high-pass filter (71) is responsive to the filtered composite signal for removing the stressing signal and for passing the quantized feedback error burst. First and second threshold comparators (72 and 76) responsive to the quantized feedback error burst produce a burst signal when the amplitude of the quantized feedback error burst crosses a predetermined threshold ($V_{R1}$ or $V_{R2}$). The occurrence of the burst signal is determined to indicate that an error has occurred in the output of the digital regenerator.

3 Claims, 5 Drawing Figures

ERROR AND STATUS DETECTION CIRCUIT FOR A DIGITAL REGENERATOR USING QUANTIZED FEEDBACK

BACKGROUND OF THE INVENTION

The invention relates to an error and status detection circuit for use in locaating a faulty pulse regenerator or cable section in a digital transmission system.

Digital transmission systems generally use pulse regenerators spaced along the transmission medium to regenerate each pulse after it has been attenuated somewhat by the medium. In general during each clock instant, the regenerators will regenerate a pulse for further transmission by comparing the level of the received pulse with a threshold level to decide what is the state of the pulse to be transmitted. A fully operative regenerator having an eye opening, or margin, in the range of 50 to 75 percent performs successfully at a very low error rate. A partially degraded regenerator having an eye opening in the range of 25 to 30 percent can regenerate data pulses marginally at a very low error rate. A malfunctioning regenerator having an eye opening of less than 20 percent, however, can cause a significant error rate.

Typical fault locating is accomplished by applying to the transmitting end of the digital system a trial stressing signal, or a pattern of digital signals including stressing. The status of each regenerator station in response to the trial stressing signal is communicated back to the transmitting terminal for analytical processing. Such stressing and analysis continues with increased stressing being used for subsequent trials until one of the regenerators makes significant errors and is identified.

In order to determine the location of a fault in a transmission line having all new or recently realigned and fully operative regenerators, except for one malfunctioning regenerator, a stressing signal of 40 percent probably would locate the malfunctioning regenerator or a faulty cable section without making a false indication that any other regenerator is faulty.

In a transmission line having many older partially degraded regenerators, except for one malfunctioning regenerator, a stress level of no more than 20 percent can cause one or more of the partially degraded regenerators to be mistaken for the actual faulty regenerator or cable section. Such a masking of the fault location is caused by errors generated by one of the degraded regenerators before the actual faulty regenerator is located.

Thus it can be understood that there is a problem in identifying a malfunctioning regenerator or faulty cable section without mistakenly identifying a degraded but functional regenerator instead of locating the actual fault. Identifying any regenerator, other than the actual fault location, can cause high mainenance costs because time and effort first is expended in servicing the marginally operational but apparently faulty regenerator station. After the marginal but apparently faulty regenerator is serviced, the actual malfunctioning regenerator or cable section still must be located and serviced.

A solution to this problem is to increase the sensitivity of the detection system for detecting the malfunctioning regenerator at a lower stress level that avoids a partially degraded but functional regenerator from masking the location of the actual malfunctioning regenerator or faulty cable section.

SUMMARY OF THE INVENTION

Such increased sensitivity is provided by an error detection circuit responsive to a filtered composite output signal from a low-pass filtered output from a digital regenerator using quantized feedback. The filtered composite signal includes a stressing signal and a quantized feedback error burst. A high-pass filter is responsive to the filtered composite signal for removing the stressing signal and for passing the quantized feedback error burst. First and second threshold comparators responsive to the quantized feedback error burst produce a burst signal when the amplitude of the quantized feedback error burst crosses a predetermined threshold. The occurrence of the burst signal is determined to indicate that an error has occurred in the digital regenerator.

BRIEF DESCRIPTION OF THE DRAWINGS

The subject invention may be more readily understood by reference to the following detailed description when that description is read with reference to the attached drawings wherein.

DETAILED DESCRIPTION

Figure 1:
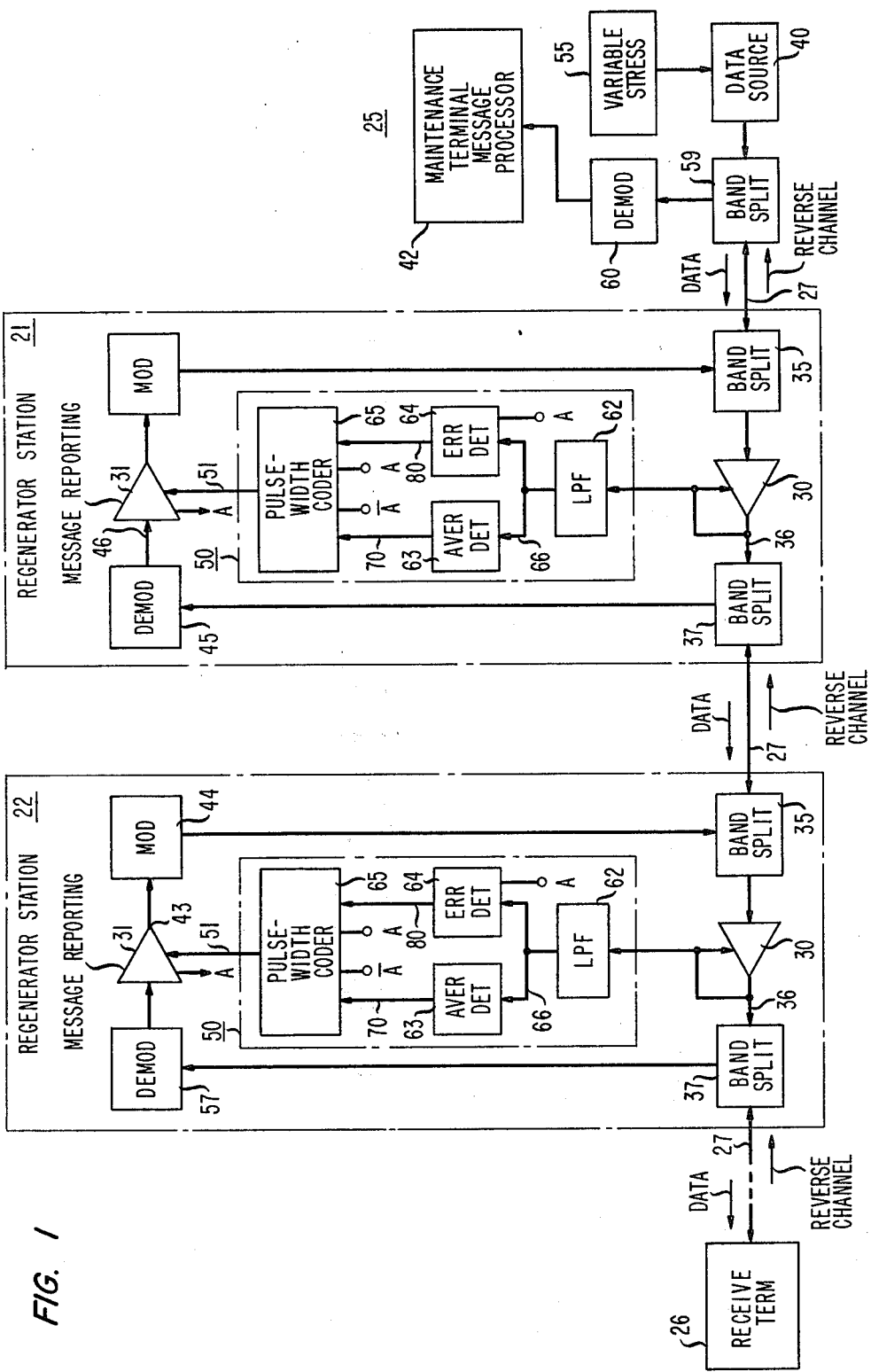
FIG. 1 is a block diagram of a digital transmission system having a plurality of stations in a tandem configuration.

Referring now to FIG. 1, there is shown a digital transmission system including regenerator stations 21 and 22 arranged in tandem for transmitting from a transmitting terminal 25 at the right to a receiving terminal 26 at the left. The stream of data is transmitted via a single coaxial cable 27 including two channels. A high frequency channel, used for transmitting the stream of data from the right to the left, is in a frequency range of 10 MHz to 150 MHz. A lower frequency channel, used for propagating maintenance and fault locating information from the left to the right, is in a frequency range below 10 MHz. Although only two regenerator stations 21 and 22 are shown in detail, more stations may be included in the system, as indicated by the dashes in the coaxial cable 27 between the station 22 and the receiving terminal 26.

Each of the regenerator stations 21 and 22 includes a line regenerator 30 and a message reporting circuit 31. All of the line regenerators are designed to detect pulses received via the coaxial cable 27 and a band splitting circuit 35, to retime and to amplify the detected pulses into a regenerated output pulse stream that is produced on a lead 36. The regenerated output pulse stream passes through another band splitting circuit 37 to the next cable section. Transmission of this data pulse stream proceeds in a forward direction from a data source 40 in the transmitting terminal 25 through the several cable sections and regenerators to the receiving terminal 26.

When the forward direction data pulse stream is interrupted and out of service, the message reporting circuits 31 can transmit a train of messages in the reverse direction from the leftmost regenerator station, not shown, to the transmitting terminal 25 wherein the train of messages is analyzed by a maintenance terminal message processor 42. The messages are transmitted from one reporting circuit through a cable section to another reporting circuit and so on to the transmitting terminal. For instance the message transmitted from an output 43 of the reporting circuit 31 of station 22 traverses a modulator 44, the band splitting circuit 35, the coaxial cable 27, the band splitting circuit 37, and a demodulator 45 to the input 46 of the reporting circuit 31 of station 21. The message reporting circuits 31 for the stations can be alike. A description of such a message reporting circuit is presented in detail in U.S. Pat. No. 4,354,054, entitled "Caboose Signal Controlled Reporting Arrangement for a Regenerator Chain" and issued in the name of J. A. Bellisio.

Each station includes a fault detection circuit 50 for generating a local station status and error message which is applied to its associated message reporting circuit 31 by way of a lead 51. Depending upon the operating condition of the adjacent cable section and the regenerator 30 of station 22, that regenerator produces an output responsive to signals from the data source 40 as modified by stressing signals from a variable stressing source 55. Generally the regenerator 30 satisfactorily regenerates those signals. If the regenerator is operating with a low margin, at some level the stressing signal will cause error bursts which are detected by the fault detection circuit 50. That circuit is arranged to produce a pulse width coded message on the lead 51 to indicate the status of the associated regenerator 30 and cable section 27.

By means of the mentioned fault location and reporting circuits, the stations produce a stream of status messages commencing with the last regenerator station before the receiving terminal 26. The reporting circuit of that last station produces its own status message and an appended caboose signal, which are sent back through the lower frequency channel to the transmitting terminal. In the intermediate stations, such as the station 22, a train of messages from stations further to the left along the transmission line is received along with the appended caboose signal. This train of messages and caboose signal are split off of the cable by the band splitting circuit 37 and are demodulated to a baseband pulse train by a demodulator 57.

The baseband pulse stream is applied as the input of the message reporting circuit 31 which retransmits the stream of received messages, deletes the received caboose signal, adds a local message to the train and appends a new caboose signal following the local message. All of the messages in the train are pulse width modulated pulses. The resulting modified train of messages and the new caboose signal are frequency modulated onto a carrier in the lower channel by the modulator 44. Band splitting circuit 35 combines into the cable 27 the new train of messages and caboose signal with the stressed data being transmitted in the forward direction through the cable 27. The train of messages proceeds through the cable in the reverse direction to the band splitting circuit 37 of the next station 21.

The foregoing continues until the train of messages arrives at the transmitting terminal 25. Again the train of messages is split off by a band splitting circuit 59 and is demodulated one last time by a demodulator 60 producing a final baseband pulse train of messages which are to be processed by the maintenance terminal message processor 42. From the train of messages, the processor 42 extracts information relating to the operational status of each regenerator section along the transmission line and any error bursts produced thereby. Such information is either stored or displayed depending upon the choice of the designer of the system.

Figure 2:
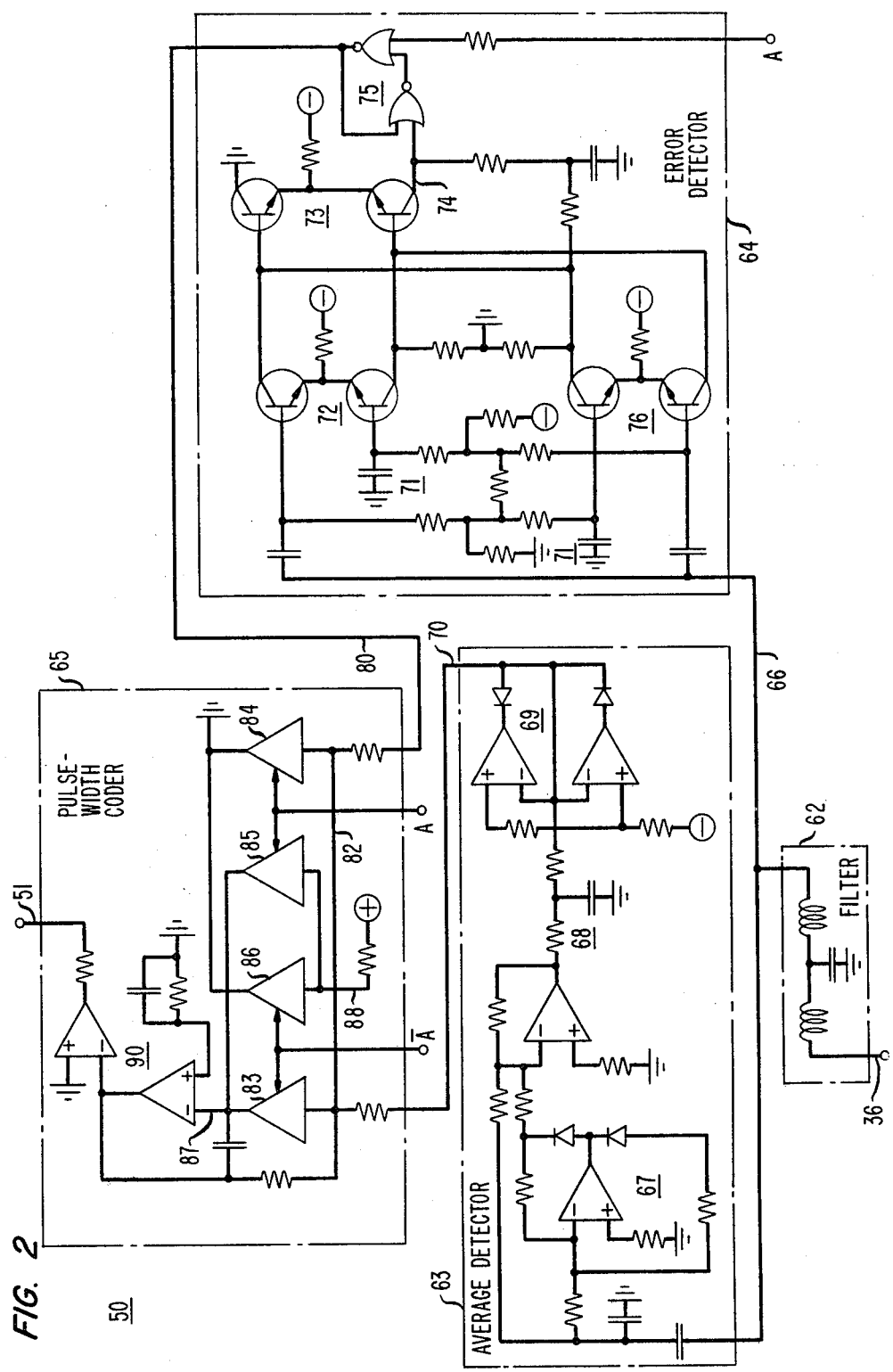
FIG. 2 is a block diagram and logic schematic of a fault detection circuit used in the stations of FIG. 1.

Referring now to FIG. 2, there is shown the fault detection circuit 50 for generating a local station status and error message from the audio stressed data signal on lead 36 and regenerated by one of the regenerators 30. Circuit 50 includes a low-pass filter 62, an average detector 63, an error detection circuit 64, and a pulse width coder 65.

Figure 3:
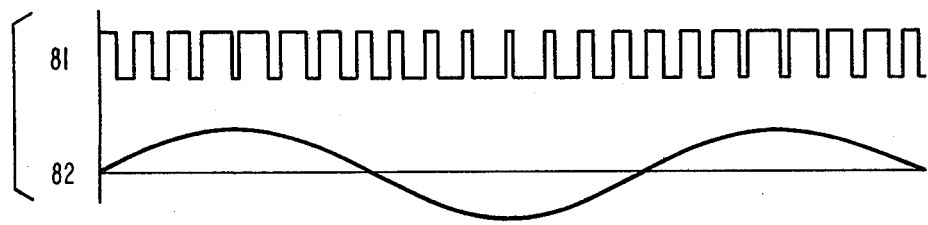
FIG. 3 shows the waveform of a pulse stream with a stressing signal that is used in maintaining and trouble shooting the stations of FIG. 1.

Referring now to FIG. 3, there is shown a data stream 81 that is produced at the output of the data regenerator 30 and is applied by way of the input lead 36 of the low-pass filter 62. This data stream includes the audio stressed data stream transmitted from the data source 40 in FIG. 1 and error bursts, if any, which occur as a result of a cable or regenerator fault. An audio stressing waveform 82 also is shown in FIG. 3.

Low-pass filter 62 of FIG. 2 filters out the data pulses of the data stream 81 producing an audio frequency waveform with some perturbations therein. The resulting waveform may appear as either one of two typical forms depending upon the operating condition of the data transmission system.

Figure 4:
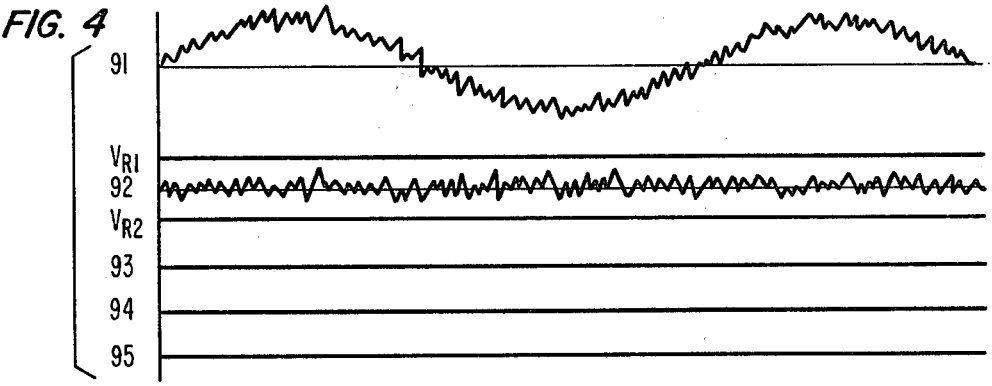
FIG. 4 is a series of waveforms showing the operation of an error detector for an operative regenerator in response to stressing input signals.

As shown in FIG. 4, a waveform 91 represents the filtered output of the low-pass filter 62, which includes the audio stressing signal with minor perturbations from the output of the digital regenerator. This is the normal form of the low-pass filter output resulting from an operable regenerator 30 producing an output data stream without any error burst. This output signal from the low-pass filter is applied by way of a lead 66 to the input of the average detector 63 and of the error detection circuit 64. Other waveforms shown in FIG. 4 represent signals occurring in other parts of the fault detection circuit 50 when it operates in response to the waveform 91. These other waveforms are to be described subsequently.

Figure 5:
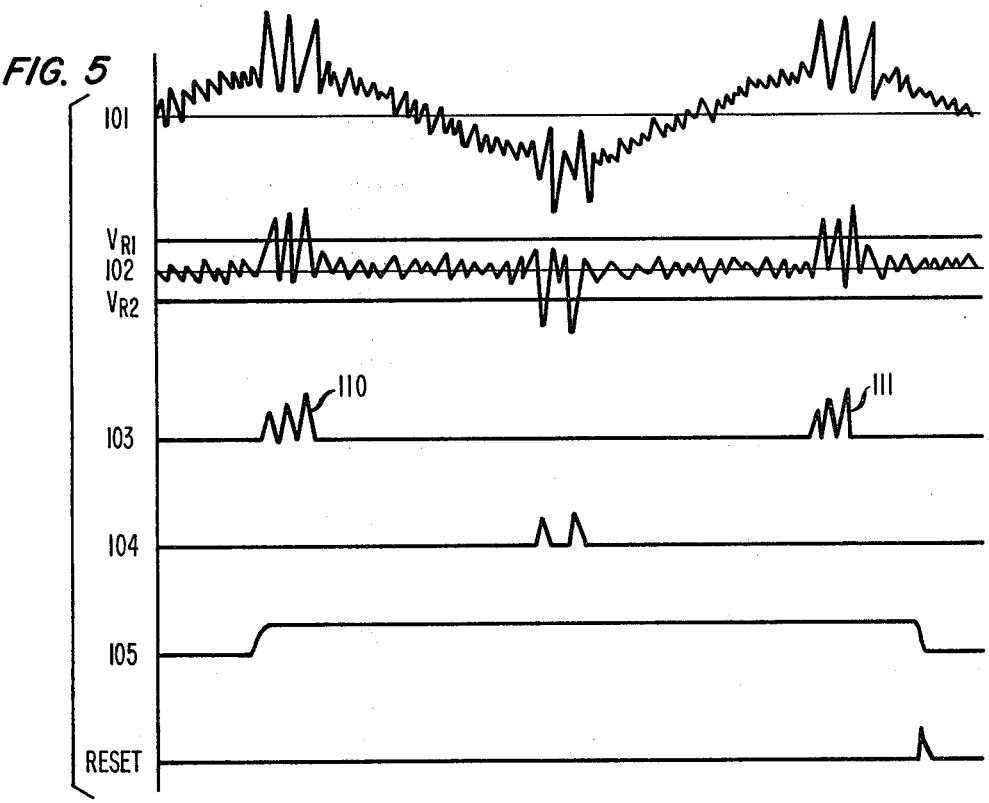
FIG. 5 is a series of waveforms showing the operation of the error detector for a faulty regenerator in response to stressing input signals.

As shown in FIG. 5, a waveform 101 represents the output on lead 66 of the low-pass filter 62 when that output is a filtered composite signal including both the audio stressing signal and perturbations including quantized feedback error bursts. This output of the low-pass filter also is applied by way of the lead 66 to the input of the average detector 63 and of the error detection circuit 64.

The average detector 63 operates essentially the same in response to either the waveform 91 or the waveform 101 produced by the low-pass filter 62. From the lead 66 these signals are rectified by a full-wave rectifier 67 to a negative polarity signal. This rectified output is smoothed by a low-pass filter 68 and is applied thereafter to a window comparator circuit 69. The window comparator may include a pair of emitter-coupled limiters and a pair of diodes interconnected to limit output amplitude at two different threshold values which are of like polarity. Upper and lower limits of the window are established to limit stressing and may for instance correspond approximately to 8 percent and 12 percent stress. The window comparator is designed to reproduce input signals transparently at the output for applied signal levels between the thresholds. Output signals are taken from a connection 70 between the pair of diodes.

During operation with either type of waveform 91 or 101 applied over lead 66, an output signal produced on lead 70 is a positive level signal. The actual level depends upon the condition of the regenerator and the amount of stressing applied by the variable stressing circuit 55 of FIG. 1.

For regular operation when stressing is anywhere within the range between the thresholds, both limiters conduct and contribute to the output signal. The positive output level on lead 70 fluctuates between the limits in correspondence with the amount of stressing.

When the regenerator or cable operating characteristic is degraded significantly below normal, the positive output level of the window comparator on lead 70 is fixed at the lower threshold value.

On the other hand when the regenerator or cable operating characteristic is enhanced for any reason, the positive output level of the window comparator is fixed at the higher threshold value.

As mentioned previously, the filtered signal waveform 91 or the filtered composite signal waveform 101 on lead 66 also is applied to the input of the error detection circuit 64. High-pass filters 71 remove the low frequency stressing signal.

For the normal operation without error bursts, the waveform 91 is high-pass filtered by filters 71 into a waveform 92 of FIG. 4 that includes only minor perturbations which have maximum amplitudes between upper and lower thresholds $V_{R1}$ and $V_{R2}$. Since the thresholds are not crossed, two emitter connected comparators 72 and 76 of FIG. 2 continue conduction unchanged as shown in waveforms 93 and 94 of FIG. 4. The cross-coupled outputs of the comparators 72 and 76 are applied to an output comparator 73 also in FIG. 2. The output of the comparator 73 also remains unchanged. As a result of the unchanged signal on output lead 74, an output flip-flop 75 remains cleared producing a steady waveform 95, as shown in FIG. 4.

For the high-pass filtered composite waveform 102 of FIG. 5 including error bursts in addition to the minor perturbations, maximum error burst amplitudes exceed at least one of the upper or lower thresholds $V_{R1}$ and $V_{R2}$. Since one of or both of the thresholds are crossed, the two emitter-connected comparators 72 of FIG. 2 produce steady output signals 103 and 104 except for occasional error bursts, as shown in FIG. 5. The comparator with the upper threshold produces a high error burst signal 110 or 111 when the error burst amplitude exceeds that upper threshold. The comparator with the lower threshold produces a high error burst signal when the error burst amplitude is below the lower threshold. These high, or error burst, signals are OR gated through the comparator 73 of FIG. 2 with the resulting signal on lead 74 being applied to the input of the flip-flop 75. The output OR gate 73 produces a positive output signal when either threshold is crossed.

As shown in a waveform 105 of FIG. 5 representing the output of the flip-flop 75 of FIG. 2, it is shown that the flip-flop responsive to the output of the OR gate 73 is set by the first high error burst signal from the OR gate. The flip-flop 73 remains set until it is subsequently reset by a reset signal on lead A and also shown in FIG. 5. Reset occurs from time to time depending upon the maintenance procedure being accomplished. A reset signal can be applied cyclically at the stressing signal frequency or from time to time as determined by the mainenance message reporting circuit 3 of FIG. 1.

An output signal from the flip-flop 75 of FIG. 2 appears on a lead 80. It may be a steady low level signal when no error burst has occurred or a steady high negative level, or burst, signal when one or more error bursts occur between reset signals.

The output of the average detector 63 on lead 70 and the output of the error detection circuit 64 on lead 80 are combined algebraically at the input of the pulse width coder 65. Polarities of those outputs are such as to produce a difference signal that is applied by way of a lead 82 to a pair of transmission gates 83 and 84. These gates 83 and 84 are enabled, respectively, by complementary control signals A and $\overline{A}$.

A reference voltage is applied to the inputs of another pair of transmission gates 85 and 86 which are enabled, respectively, by the control signals A and $\overline{A}$.

The output of gates 83 and 85 are interconnected, but because they are enabled alternatively the output signal of only one of them at a time is applied to a common output lead 87.

Outputs of gates 84 and 86 are connected to ground so that the output of whichever one of these two gates is enabled at any time is conducted to ground.

Thus there is a cross-over arrangement for the combined input signal applied by way of lead 82 and the reference signal applied by way of lead 88. The combined input signal on lead 82 is coupled to the output lead 87 when the reset signal is not active. At that time the reference signal on lead 88 is conducted to ground. Conversely the combined input signal on lead 82 is conducted to ground when the reset signal is active. Then the reference signal on lead 88 is coupled to the output lead 87.

Signals on the output lead 87 are applied as the input to an integrator 90 for producing a pulse that varies in width between minimum and maximum limits. Whenever the average detector is producing an output within the nominal range between limits and no error bursts are being detected, the combined signal is coupled through gate 83, the lead 87, and the integrator 90 producing a pulse on output terminal 51 having a pulse width corresponding to the operational status of the regenerator 30. This is accomplished because the combined signal on lead 82 effectively is the average output produced by the average detector 63. Flip-flop 75 remains reset and produces a zero output. Thus the pulse width coder responds to the output of the average detector 63 and encodes that output into a pulse width coded signal that indicates the regenerator is operating satisfactorily.

As the stress level is increased by the variable stress circuit 55 of FIG. 1, the pulse width of the signal at terminal 51 increases to a maximum value which is determined by the window limiter 69 of FIG. 2 in the average detector 63. If the stress level increases after the maximum pulse width is reached, the maximum width pulse is produced at terminal 51 additionally indicating that the regenerator 30 is operating satisfactorily.

Whenever the average detector is producing an output within the nominal range or at the maximum pulse width and an error burst occurs, the flip-flop 75 in the error detection circuit is set and produces the high negative level, or burst, signal output. This burst signal on lead 80 is combined with the positive output level on lead 70 into the combined signal on lead 82. The amplitude of that combined signal is such that the output pulse at terminal 51 has a width below the pulse width minimum. Thus the minimum width pulse is produced at the terminal 51 indicating that the regenerator 30 has produced a quantized feedback error burst and therefore has failed.

Upon receipt of the reset signal, the transmission gates cross over so that the reference voltage on lead 88 is coupled to the input of the integrator 90 setting it to its initial condition. Thus the pulse width modulator is reset to start from the same initial condition each time it operates. The combined signals on lead 82 are conducted to ground.

Pulse width encoded signals on lead 51 provide a local station message that is applied to the message reporting circuit 31 for delivery through the system back to the maintenance terminal message processor 42 of FIG. 1.

Thus pulse width coded messages are produced by the fault location circuitry 50 and are applied to the message reporting circuit 31. As described in the aforementioned Bellisio patent, a message from each operating station in the system is put into a train of messages that is transmitted to the maintenance terminal processor 42 of FIG. 1.

The messages represent the operating status of and any errors caused by the associated regenerator station or preceding cable section. A maximum width pulse represents an operable regenerator sucessfully regenerating input data modulated with a high stressing signal. A minimum width pulse represents either a faulty regenerator or preceding cable section. In this latter case, the minimum width pulse indicates that the regenerator either produced a very low level output signal or a quantized feedback error burst.

When the train of messages is received by the maintenance terminal processor 42, each message is decoded by the processor and is identified to a specific regenerator station by its position in the train. For instance if all of the regenerators are operable and all of the cable sections are in satisfactory condition, the first message of the train represents the furthest regenerator station from the maintenance terminal processor and the last message represensts the closest regenerator station. If there is a fault along the regenerator line, the first message of the train helps locate that fault. The maintenance terminal processor determines where the fault is located by counting the messages in the train.

The foregoing describes an embodiment of a fault detection arrangement. That arrangement together with other arrangements which are obvious in view thereof are considered to be within the scope of the invention.

What is claimed is:

1. An error detection circuit (64) responsive to a filtered composite output signal (101) from a low-pass filtered output from a digital regenerator (30) using quantized feedback, the filtered composite signal including a stressing signal and a quantized feedback error burst; the error detection circuit (64) being characterized by a high-pass filter (71) responsive to the filtered composite signal for removing the stressing signal and for passing the quantized feedback error burst;

first and second threshold comparators (72 and 76) responsive to the quantized feedback error burst, the first threshold comparator (72) producing a first error burst signal if the amplitude of the quantized feedback error burst crosses a predetermined first threshold ($V_{R1}$) and the second threshold comparator (76) producing a second error burst signal if the amplitude of the quantized feedback error burst crosses a predetermined second threshold ($V_{R2}$); and means (73, 75) responsive to the first or second error burst signal for determining a burst signal.

2. A status detection circuit responsive to an output signal from a digital regenerator using quantized feedback; the status detection circuit including a low-pass filter and an average detector connected in tandem and responsive to the output signal for determining a signal representing the amplitude of a component thereof;

an error detection circuit connected in tandem with the low-pass filter and responsive to an error burst signal included in the output signal from the digital regenerator for producing a burst signal; and means responsive to the signal representing the amplitude and to the output of the error detection circuit including the burst signal for encoding a message indicating the operating status of the digital regenerator.

3. A status detection circuit in accordance with claim 2, wherein the error detection circuit further includes a high-pass filter responsive to the output signal from the digital regenerator for passing the error burst signal;

first and second threshold comparators and responsive to the error burst signal, the first threshold comparator producing a first error burst signal when the amplitude of the error burst signal crosses a first predetermined threshold ($V_{R1}$) and the second threshold comparator producing a second error burst signal when the amplitude of the error burst signal crosses a predetermined second threshold ($V_{R2}$); and means responsive to the first or second error burst signal for determining a burst signal.

* * * * *